(12) United States Patent
Ohtsu

(10) Patent No.: US 6,989,950 B2
(45) Date of Patent: Jan. 24, 2006

(54) MAGNETIC TAPE AND MANUFACTURING METHOD THEREOF, AND SERVO WRITER AND SERVO WRITE METHOD

(75) Inventor: Hiroki Ohtsu, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 68 days.

(21) Appl. No.: 10/839,245

(22) Filed: May 6, 2004

(65) Prior Publication Data

US 2005/0057838 A1 Mar. 17, 2005

(30) Foreign Application Priority Data

Sep. 11, 2003 (JP) .............................. 2003-320009

(51) Int. Cl.
*G11B 5/09* (2006.01)
(52) U.S. Cl. ..................................... 360/48; 360/77.12
(58) Field of Classification Search .................... None
See application file for complete search history.

(56) References Cited

U.S. PATENT DOCUMENTS

| 5,689,384 | A | | 11/1997 | Albrecht et al. | |
|---|---|---|---|---|---|
| 6,031,673 | A | * | 2/2000 | Fasen et al. | 360/53 |
| 6,134,070 | A | * | 10/2000 | Tran et al. | 360/75 |
| 6,169,640 | B1 | * | 1/2001 | Fasen | 360/48 |
| 6,320,719 | B1 | * | 11/2001 | Albrecht et al. | 360/77.12 |
| 6,912,104 | B2 | * | 6/2005 | Trabert et al. | 360/77.12 |
| 6,934,115 | B1 | * | 8/2005 | Kientz et al. | 360/77.12 |
| 2003/0123179 | A1 | * | 7/2003 | Molstad et al. | 360/75 |
| 2003/0123181 | A1 | * | 7/2003 | Hennecken et al. | 360/77.13 |

FOREIGN PATENT DOCUMENTS

JP 11-273040 A 10/1999

* cited by examiner

*Primary Examiner*—David Hudspeth
*Assistant Examiner*—Dismery Mercedes
(74) *Attorney, Agent, or Firm*—Sughrue Mion, PLLC

(57) ABSTRACT

A magnetic tape of the present invention comprises a plurality of servo bands and servo signals for performing tracking-control of a magnetic head, wherein the servo signals are recorded on the servo bands, wherein a DC magnetization region magnetized in one direction by direct current is arranged along longitudinal directions of the magnetic tape on the servo bands, wherein each of the servo signals is magnetized in a reverse direction for the one direction of a DC magnetization and is recorded within the DC magnetization region, and wherein any of a relative ratio and relative difference of DC magnetization intensity in the DC magnetization region and recording magnetization intensity of each of the servo signals differs for each of the servo bands.

20 Claims, 5 Drawing Sheets

MAGNETIC TAPE AND MANUFACTURING METHOD THEREOF, AND SERVO WRITER AND SERVO WRITE METHOD

BACKGROUND OF THE INVENTION

1. Field of the Invention

The present invention relates to a magnetic tape where a servo signal is written on a servo band and a manufacturing method thereof, and a servo writer and servo write method for writing the servo signal on the magnetic tape.

2. Description of the Related Art

These years, in a magnetic tape for use in a backup of a computer and the like a high density recording progresses more and more, and in the future the high density recording till around several tens of terabytes is foreseen. Based upon the high density recording, in the magnetic tape a number of data tracks increases, and a width of the data tracks and a distance between adjacent data tracks become narrower. In addition, based upon an augmentation of a memory capacity, the magnetic tape itself becomes a thin layer. Furthermore, in order to handle the increase of the data tracks in the magnetic tape, in a magnetic tape recording/reproducing apparatus a number of a winding/rewinding of the magnetic tape for recording/reproducing data increases, and widths of a data signal recording/reproducing element and a servo read element also become narrower. Consequently, in order to precisely read data recorded in high density on a plurality of data tracks arranged in a lateral direction of the magnetic tape, it is necessary to accurately grasp which data track a magnetic head utilizes and performs recording/reproducing. Therefore, it becomes very important to specify which servo band out of a plurality of servo bands provided in the lateral direction of the magnetic tape a read head or a recording head refers to and is positioned at.

Conventionally, as a system for performing position control of a magnetic head by a servo signal, there are an amplitude servo method of performing the position control by a width of a read servo pattern, a timing-based servo method of performing the position control by a timing of the read servo pattern, and the like. In a system for recording the servo signal (servo pattern) of the timing-based servo method on the magnetic tape, a phase difference is provided for the servo signal of each servo band by off-setting the servo pattern of each servo band in longitudinal directions of the magnetic tape. And it is proposed to specify each servo band and identify a position of a lateral direction of a relevant data band on the magnetic tape by simultaneously reading servo signals of two servo bands at both sides for sandwiching a data track, and measuring the phase difference (for example, see Japanese paraphrase 27 and FIG. 6 in Japanese Patent Laid-Open Publication Hei 11-273040).

However, when in the method for specifying each servo band by respectively reading servo signals from two servo bands adjacent to both sides of a data band, in a recording/reproducing apparatus, not to mention both sides, a one-side servo read head for reading a servo band causes a read fault of the servo signals due to an unknown reason or a malfunction, a position of a data track in a lateral direction of the magnetic tape could become unidentificable. In addition, since it is necessary to identify and specify the data track by comparing the servo signals written on the servo bands at both sides of the data track, it could take time to access each data track.

Consequently, by reading servo a signal written on a servo band out of a plurality of servo bands are strongly requested a magnetic tape that can identify and specify a position of a data track in a lateral direction of the magnetic tape and a manufacturing method thereof, and a servo writer and servo write method that can write the servo signal on the magnetic tape.

SUMMARY OF THE INVENTION

A first aspect of the present invention for solving the problems described above is a magnetic tape where servo signals for performing tracking-control of a magnetic head are recorded on a plurality of servo bands, wherein a DC (Direct Current) magnetization region magnetized in one direction by direct current is arranged along longitudinal directions of the magnetic tape on each of the servo bands, wherein each of the servo signals is magnetized in a reverse direction for the one direction of a DC magnetization and is recorded within the DC magnetization region, and wherein any of a relative ratio and relative difference of DC magnetization intensity in the DC magnetization regions and recording magnetization intensity of each of the servo signals differs for each servo band.

In accordance with the magnetic tape an output difference of each of the servo signal occurs by any of the relative ratio and relative difference of the DC magnetization intensity in the DC magnetization region and the recording magnetization intensity of each of the servo signals, where the DC magnetization region and each of the servo signals are formed on each of the servo bands, differing. And by reading each of the servo signals having a different output value for each of the servo bands, each of the servo bands in the lateral direction of the magnetic tape can be identified and specified.

A second aspect of the present invention is a manufacturing method of a magnetic tape where servo signals for performing tracking-control of a magnetic head are recorded on a plurality of servo bands, wherein the servo bands are magnetized in one direction along the longitudinal directions of the magnetic tape; a DC magnetization region is formed within each of the servo bands; and then, when magnetizing the servo signals in a reverse direction for the one direction of a DC magnetization and recording each of the servo signals within the DC magnetization region, any of a relative ratio and relative difference of DC magnetization intensity in the DC magnetization region and recording magnetization intensity of each of the servo signals is designed to differ for each servo band.

In accordance with the manufacturing method, when magnetizing the each of the servo signals in the reverse direction for the one direction of a DC magnetization and recording it within the DC magnetization region magnetized by direct current along the longitudinal directions of the magnetic tape, the magnetic tape where each of the servo signals having a different output value for each of the servo bands can be obtained by designing any of the relative ratio and relative difference of the DC magnetization intensity in the DC magnetization region and the recording magnetization intensity of each of the servo signals to differ for each servo band.

A third aspect of the present invention is a servo writer that writes servo signals for performing tracking-control of a magnetic head on a plurality of servo bands, and the servo writer comprises a DC delete head for discontinuously magnetizing each of the servo bands in one direction along longitudinal directions of a magnetic tape by direct current and forming a DC magnetization region at a predetermined distance within each of the servo bands; and a servo write head for adding a recording current pulse of a single polarity within the DC magnetization region, magnetizing the servo signals in a reverse direction for the one direction of a DC magnetization, and writing the servo signals so that any of a relative ratio and relative difference of DC magnetization intensity in the DC magnetization region and recording magnetization intensity of each of the servo signals differs for each servo band.

In accordance with the servo writer the magnetic tape where each of the servo signals having a different output value for each of the servo bands can be obtained by: the DC delete head forming the DC magnetization region magnetized in the one direction along the longitudinal directions of the magnetic tape; the servo writer adding the recording current pulse of the single polarity within the DC magnetization region and magnetizing the servo signals in the reverse direction for the one direction of a DC magnetization; and writing the servo signals so that any of the relative ratio and relative difference of the DC magnetization intensity in the DC magnetization region and the recording magnetization intensity of each of the servo signals differs for each servo band.

A fourth aspect of the present invention is a servo write method for supplying a recording current to a servo write head and writing servo signals on servo bands of a magnetic tape, wherein the servo bands are magnetized in one direction along longitudinal directions of the magnetic tape; a DC magnetization region is formed within each of the servo bands; and then, when adding a recording current pulse of a single polarity to said servo write head and recording each of the servo signals magnetized in a reverse direction for the one direction of a DC magnetization within the DC magnetization region, any of a relative ratio and relative difference of DC magnetization intensity in the DC magnetization region and recording magnetization intensity of each of the servo signals is designed to differ for each servo band.

In accordance with the servo write method, when magnetizing the servo bands to the one direction along the longitudinal directions of the magnetic tape on the servo bands by direct current and recording each of the servo signals magnetized in the reverse direction for the one direction of the DC magnetization within the DC magnetization region, each of the servo signals having a different output value for each of the servo bands can be obtained by making any of the relative ratio and relative difference of the DC magnetization intensity in the DC magnetization region and the recording magnetization intensity of each of the servo signals differ for each servo band.

BRIEF DESCRIPTION OF THE DRAWINGS

In FIGS. 2A and 2B.

In FIGS. 3A and 3B.

In FIGS. 4A to 4C.

In FIGS. 5A and 5B.

DESCRIPTION OF THE PREFERRED EMBODIMENTS

Hereinafter, a magnetic tape and manufacturing method thereof, and servo writer and servo write method of the present invention will be described in detail, referring to drawings. First, referring to FIGS. 1 to 3, the manufacturing method of the magnetic tape and a servo writer of the present invention will be described. Meanwhile, for convenience of explanation, a magnetic tape having five servo bands is described as an embodiment.

Figure 1:
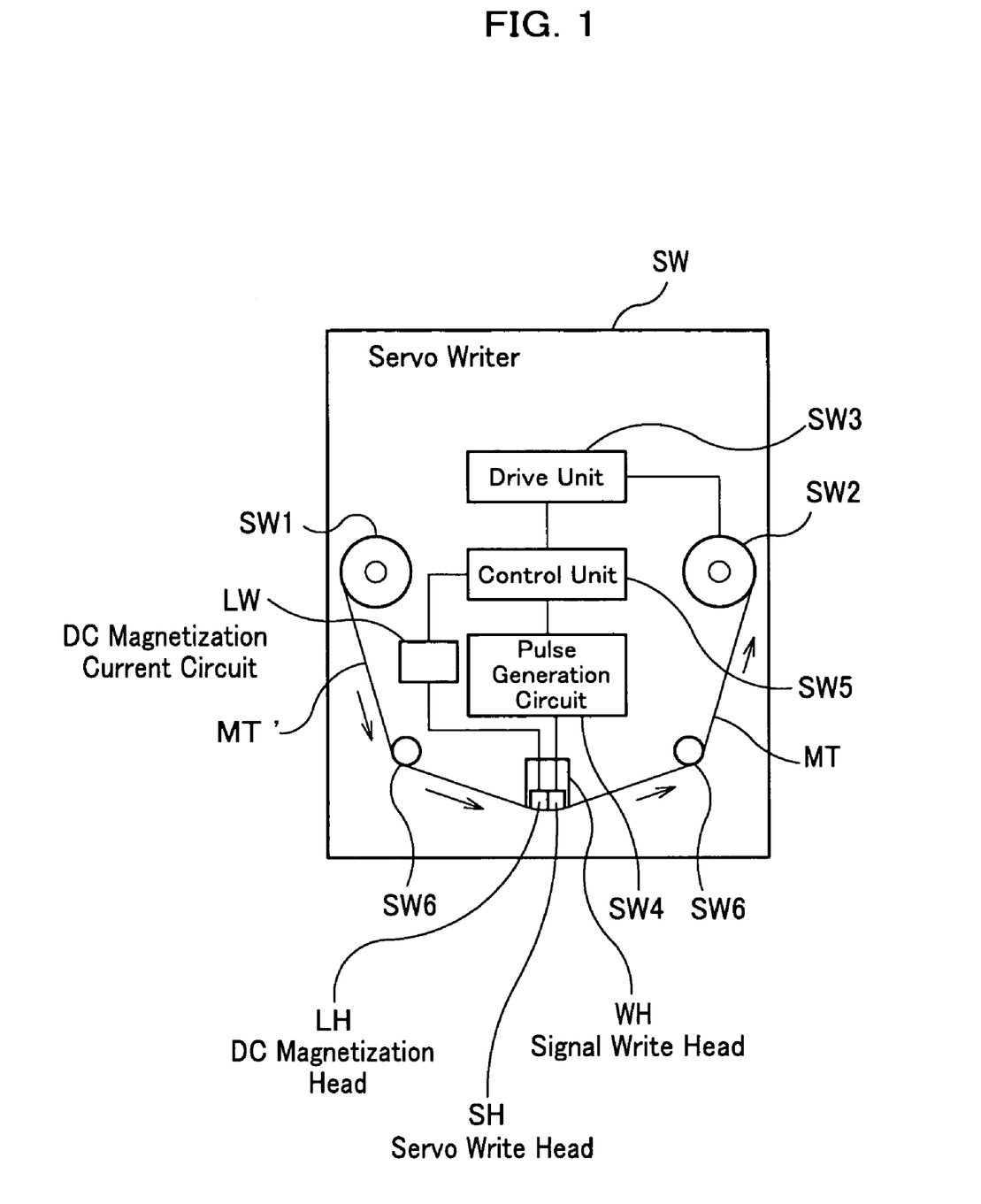
FIG. 1 is a schematic drawing showing an embodiment of a servo writer used for writing servo signals on a magnetic tape of the present invention.

FIG. 1 shows a servo writer SW for writing DC (Direct Current) magnetization regions LZ1 to LZ5 (see FIG. 2A) and servo signals S1 to S5 (see FIG. 3A) on a magnetic tape MT'.

The servo writer SW shown in FIG. 1 mainly comprises a supply reel SW1, a winder SW2, a drive unit SW3, a DC magnetization current circuit LW, a DC magnetization head LH, a pulse generation circuit SW4, a signal write head WH, and a control unit SW5. In addition, the servo writer SW also comprises a power source unit, a cleaning unit for cleaning the magnetic tape MT, a verification unit for inspecting the servo signals S1 to S5 that are written, and the like (not shown).

In the supply reel SW1 the magnetic tape MT' is set as a large winding pancake that is slit from a wide width whole cloth into a product width before writing the servo signals S1 to S5, and is sent out when writing them. The magnetic tape MT' sent out from the supply reel SW1 is carried to the signal write head WH with being guided by one of guides SW6 and the like.

Figure 2A:
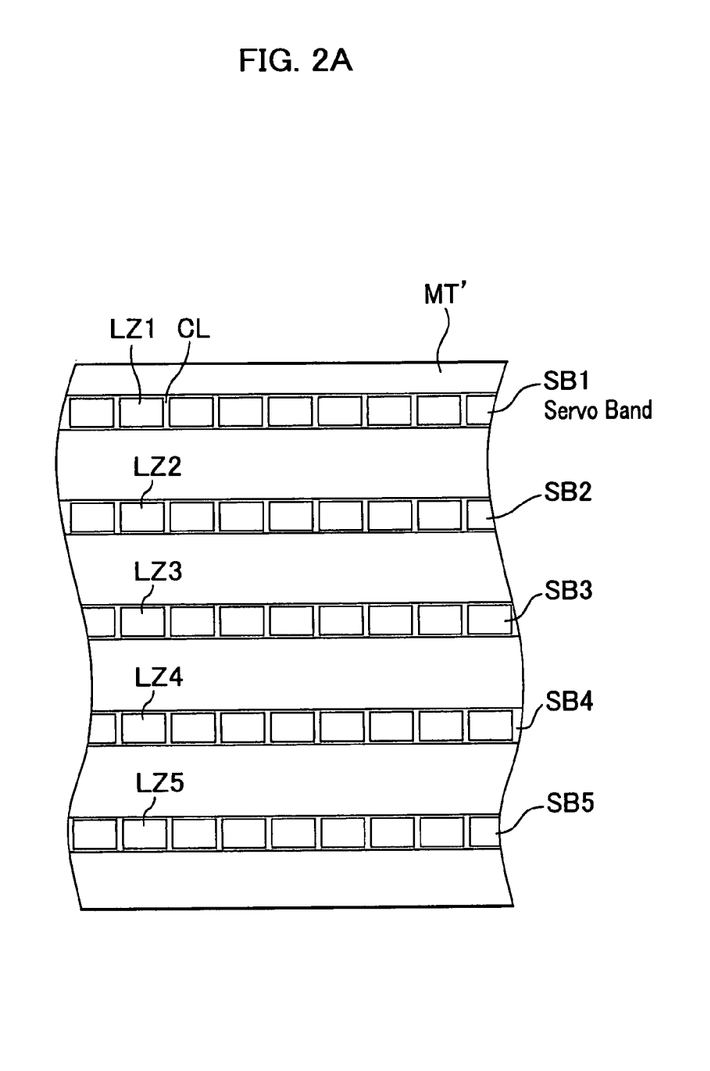
FIG. 2A is a conceptual drawing showing a state where DC (Direct Current) magnetization regions are formed on servo bands.
Figure 2B:
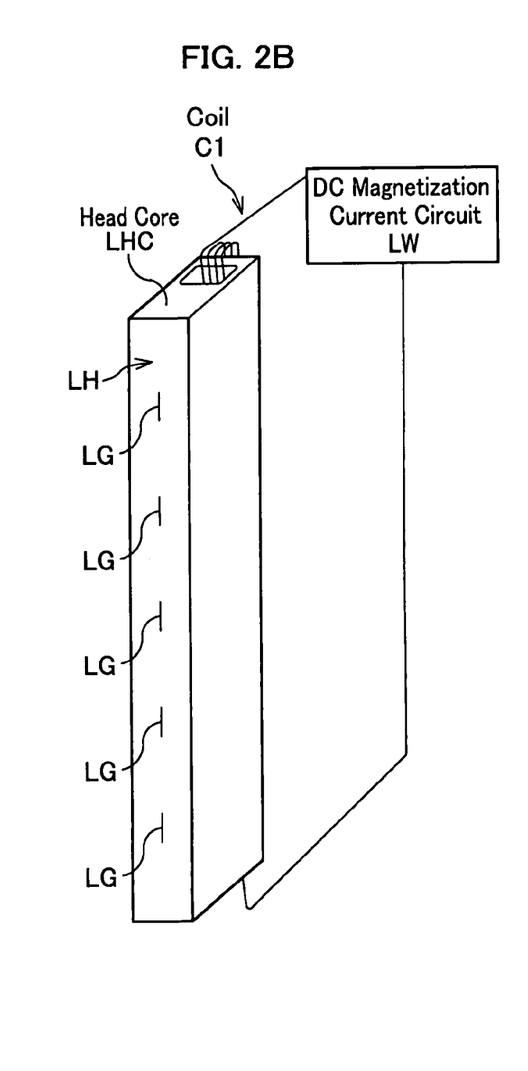
FIG. 2B is a schematic drawing showing a structure of a DC magnetization head LH.

The signal write head WH has the DC magnetization head LH arranged therein at an upstream side and a servo write head SH arranged at a downstream side. In the signal write head WH, as shown in FIG. 2A, first on each of servo bands SB1 to SB5 of the magnetic tape MT' are formed the DC magnetization regions LZ1 to LZ5 discontinuously magnetized in one direction (for example, a plus direction) by direct current with opening a predetermined distance CL in longitudinal directions of the magnetic tape MT'.

Figure 3A:
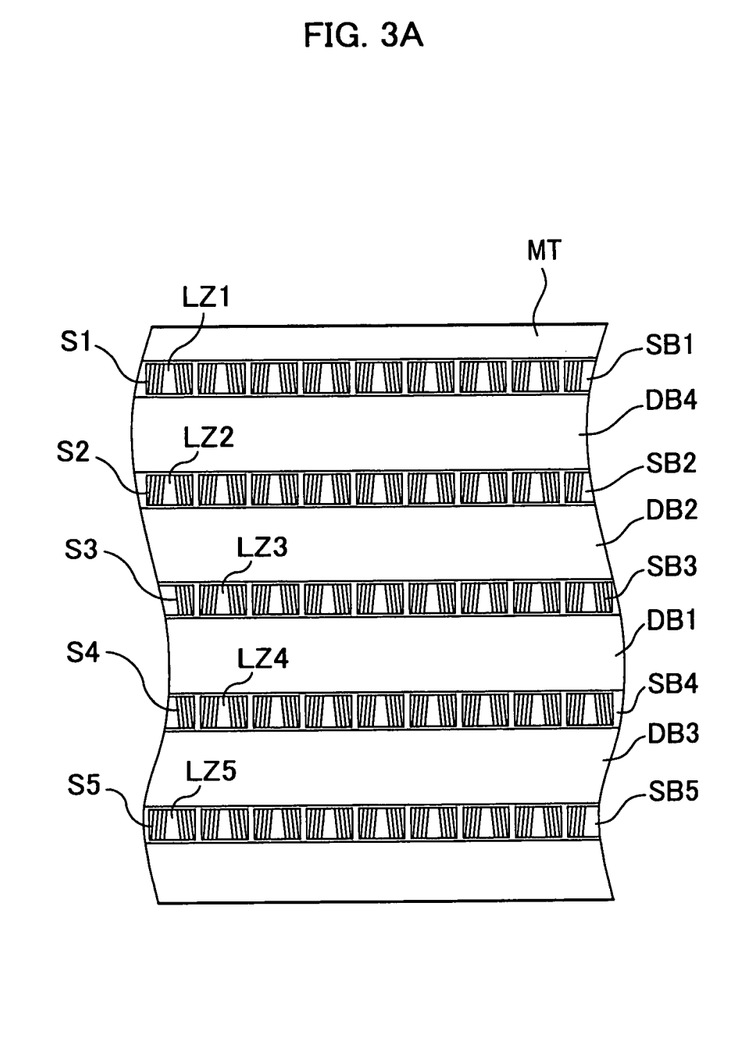
FIG. 3A is a conceptual drawing showing a state where servo signals are written within DC magnetization regions.
Figure 3B:
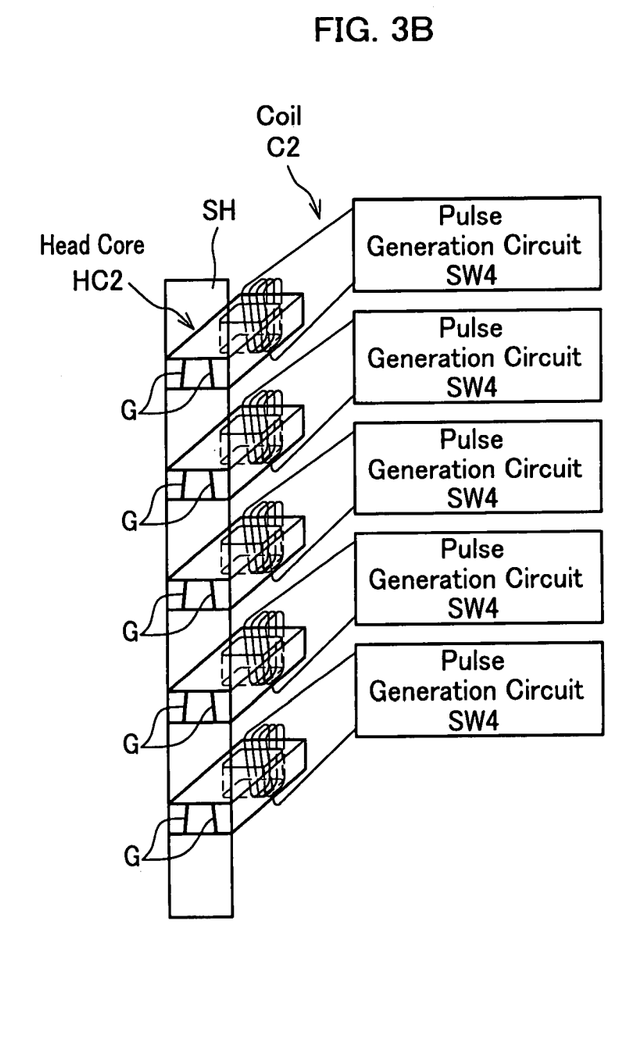
FIG. 3B is a schematic drawing showing a structure of a servo write head.

Then in the servo write head SH arranged at an downstream side of the DC magnetization head LH, as shown in FIGS. 3A and 3B, a recording current pulse of a single polarity is added to the servo write head SH from the pulse generation unit SW4, and the servo signals S1 to S5 are written within the DC magnetization regions LZ1 to LZ5 with being magnetized in a reverse direction (for example, a minus direction) for the one direction of a DC magnetization. And the magnetic tape MT where the servo signals S1 to S5 are written with the servo write head SH is carried till the winder SW2 with being guided by another one of the guides SW6 and the like. The winder SW2 is rotationally driven by the drive unit SW3 and winds the magnetic tape MT where the servo signals S1 to S5 are written.

The drive unit SW3 is a unit for rotationally driving the winder SW2 and comprises a motor, a motor drive circuit for supplying a current to the motor, a gear for coupling a motor shaft and the winder SW2, and the like. The drive unit SW3 generates a motor current in the motor drive circuit, based on a motor current signal from the control unit SW5, supplies the motor current to the motor, and furthermore, transmits rotational driving force of the motor through the gear, thereby rotationally driving the winder SW2.

The DC magnetization current circuit LW is a circuit for supplying a one-directional DC current pulse at a predetermined time interval to a coil C1 (see FIG. 2B) provided in a DC magnetization head core LHC, based on a control signal from the control unit SW5, and is provided for the coil C1 provided in the DC magnetization head LH. The DC magnetization current circuit LW forms each of the DC magnetization regions LZ1 to LZ5 on each of the servo bands SB1 to SB5 with opening the constant distance CL in the longitudinal directions of the magnetic tape MT' by applying a DC magnetization current of a one-directional polarity at a predetermined time interval to the DC magnetization head LH, based on the control signal from the control unit SW5. The DC magnetization head LH magnetizes a magnetic layer of the magnetic tape MT' in one direction by leak fluxes from gaps LG (see FIG. 2B) provided at each position corresponding to each of the servo bands SB1 to SB5 by the DC magnetization current added to the coil C1 from the DC magnetization current circuit LW. In addition, by adjusting a running speed of the magnetic tape MT' and a time interval for supplying the DC current pulse is decided the distance CL between the DC magnetization regions LZ1 to LZ5 that is discontinuously formed in the longitudinal directions of the magnetic tape MT.

The pulse generation circuit SW4 is a circuit for supplying a plurality of coils C2 (see FIG. 3B), which are provided at the servo write head SH, based on a pulse control signal from the control unit SW5 to a recording current pulse, and the circuit SW4 is independently provided at each of the plurality of the coils C2 and flows a current of a different current value to each of the coils C2. Thus a recording pulse of different recording magnetization intensity is written in each of the DC magnetization regions LZ1 to LZ5. Meanwhile, a winding number of each of the coils C2 may also be changed, a current value to the coil C1 described later may also be changed, and furthermore, a winding number of the coil C1 may also be changed. To be more precise, each of the pulse generation circuits SW4 writes each of the servo signals S1 to S5 within each of the DC magnetization regions LZ1 to LZ5 by generating a pulse current having a single polarity (any of a plus polarity and a minus polarity) of a reverse direction at the DC magnetization head LH, based on a pulse control signal from the control unit SW5. Meanwhile, the recording current pulse is a sufficient current value for magnetizing the magnetic layer of the magnetic tape MT' by leak magnetic fluxes from gap patterns G (see FIG. 3B), and is set, taking such properties of the coils C2 of the servo write head SH into consideration.

The servo write head SH has, as shown in FIG. 3B, the gap patterns G that are a non-parallel bottom-open-reverse-V letter formed at a position corresponding to each of the servo signals S1 to S5, and writes each of the servo signals S1 to S5 by each of the gap patterns G. Each of the gap patterns G, which are provided at an equal distance in a lateral direction of the magnetic tape MT, is precisely arranged at the position in the lateral direction of the magnetic tape MT.

Next, a method for writing the servo signals S1 to S5 on the magnetic tape MT' by the servo bands writer SW will be described, referring to FIGS. 1A and 1B.

As shown in FIG. 1, a running of the magnetic tape MT' is started by a running system, and a predetermined current value of a direct current is applied at a predetermined time interval to the coil C1 wound on the head core LHC of the DC magnetization current circuit LW. When thus the predetermined direct current is applied to the head core LHC, each of the DC magnetization regions LZ1 to LZ5 is formed at the predetermined distance CL on each of the servo signals S1 to S5 by each of the gaps LG as shown in FIG. 2A.

Next, to the magnetic tape MT', where each of the DC magnetization regions LZ1 to LZ5 is formed on each of the servo bands SB1 to SB5, is supplied a predetermined recording current pulse of a minus polarity from each of the pulse generation circuits SW4 by each of the coils C2 wound on each of the head cores HC2 of the servo write head SH arranged at the downstream side of the DC magnetization head LH. When thus a predetermined recording current is supplied to each of the head cores HC2, each of predetermined servo signals S1 to S5 is recorded on each of the servo bands SB1 to SB5 by each of the gap patterns G.

Then a method for accurately writing the servo signals S1 to S5 within the DC magnetization LZ1 to LZ5 may be any method and is not specifically limited. For example, is available any of such methods: a method of adjusting positions of the DC magnetization head LH and the servo write head SH, and performing a forming of the DC magnetization regions LZ1 to LZ5 on the servo signals S1 to S5 and a writing of the servo signals S1 to S5 by the servo write head SH in accordance with a running speed of the magnetic tape MT'; and another method of performing the forming of the DC magnetization regions LZ1 to LZ5 by the DC magnetization head LH and the writing of the servo signals S1 to S5 by the servo write head SH by a software adjusted as needed in accordance with such the running speed of the magnetic tape MT'.

Figure 4A:
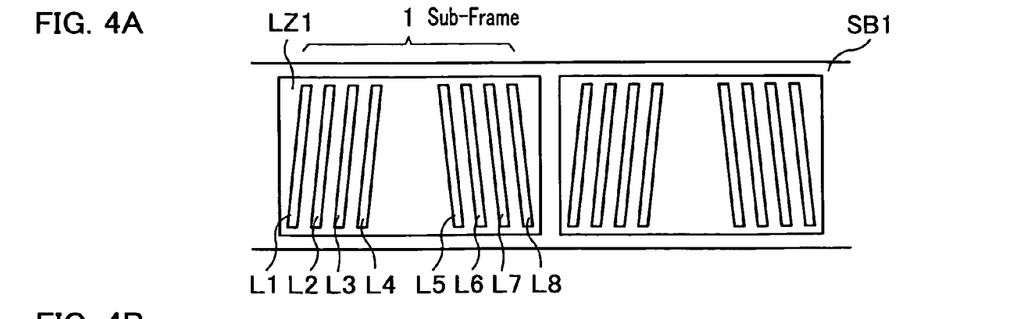
FIG. 4A is an enlarged schematic drawing showing a part of a servo band in a magnetic tape of a first embodiment of the present invention.
Figure 4B:
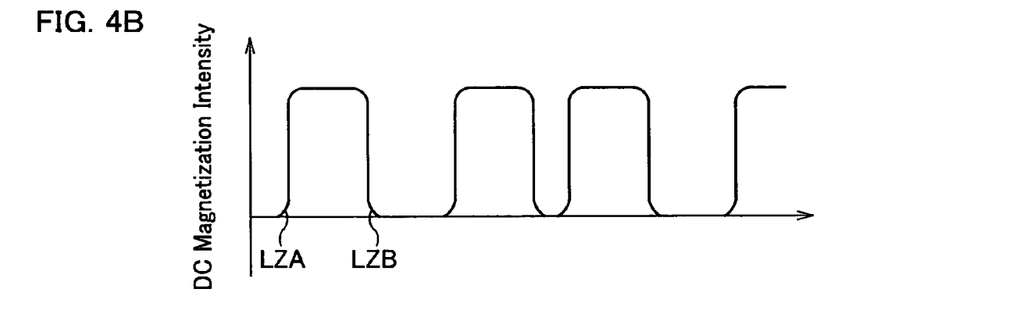
FIG. 4B is a conceptual drawing showing a magnetization state of DC magnetization regions of the magnetic tape.
Figure 4C:
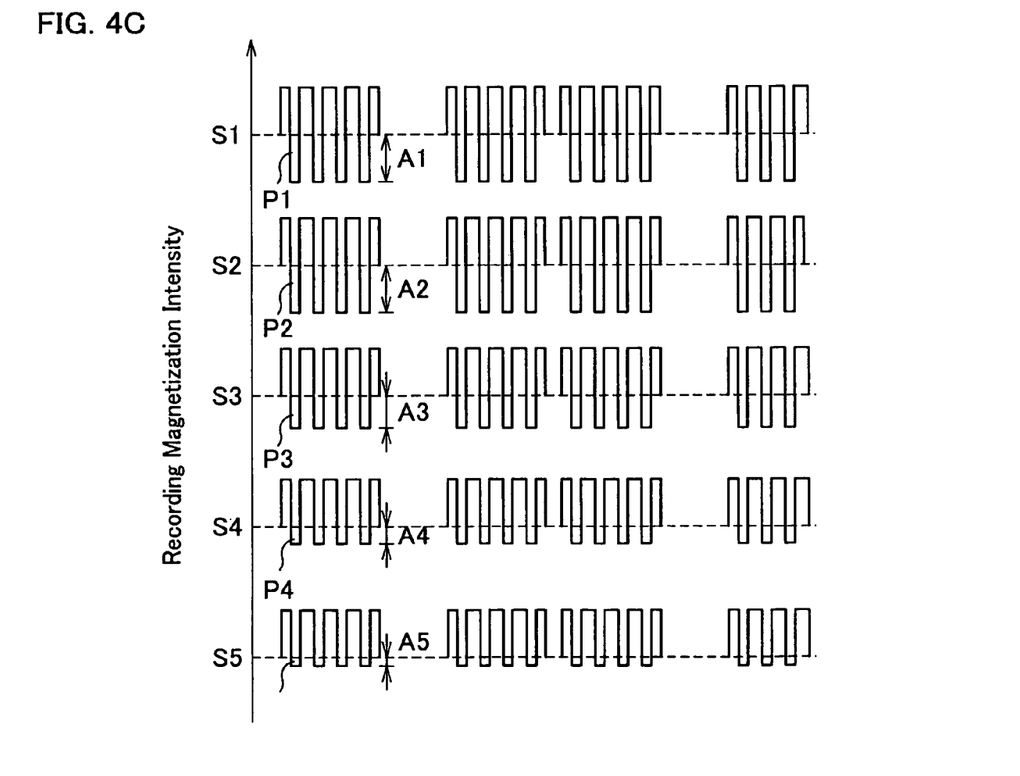
FIG. 4C is a conceptual drawing showing a magnetization state of servo signals.

And the DC magnetization regions LZ1 to LZ5 and servo signals S1 to S5 on each of the servo bands SB1 to SB5 of the magnetic tape MT are formed and written so that relative ratios of DC magnetization intensity of the DC magnetization regions LZ1 to LZ5 and recording magnetization intensity of the servo signals S1 to S5 differ (see FIG. 4C).

Next, the magnetic tape MT of a first embodiment of the present invention, where the DC magnetization regions LZ1 to LZ5 and the servo signals S1 to S5 are written as above, will be described, referring to FIG. 3A, and FIGS. 4A and 4B.

As shown in FIG. 3A, in the magnetic tape MT along longitudinal directions thereof are provided five servo bands SB1 to SB5 at an equal distance in a lateral direction of the magnetic tape MT, and between these servo bands are provided data bands DB1 to DB4. And on each of the servo bands SB1 to SB5 are, as shown in FIGS. 2A and 3A, formed the DC magnetization regions LZ1 to LZ5 that are discontinuously magnetized in one direction with opening the distance CL. Within each of the DC magnetization regions LZ1 to LZ5 is written each of the predetermined servo signals S1 to S5 for performing tracking-control of a magnetic head.

The servo signals S1 to S5 are, as in FIG. 4A where nothing but the servo band SB1 is shown in enlargement, configured of sub-frames 1 that are arbitrary and plurally provided along the longitudinal directions of the magnetic tape MT. And the sub-frames 1 are formed as non-parallel bottom-open-reverse-V letters that are formed of four linear patterns L1 to L4 obliquely formed for the longitudinal directions of the magnetic tape MT and four linear patterns L5 to L8 symmetrically formed for these. Incidentally, by these linear patterns L1 to L8 resulting in being formed by the gap patterns G (see FIG. 3B) of the bottom-open-reverse-V letters, from a left side shown in this order, a distance of a linear pattern configuring pairs of the bottom-open-reverse-V letters, L1 and L5, L2 and L6, and L3 and L7, and L4 and L8 is made a same distance as that of the gap patterns.

In such the servo bands SB1 to SB5, as shown in FIG. 4C, the DC magnetization regions LZ1 to LZ5 are magnetized in a plus magnetic direction at the DC magnetization intensity shown in FIG. 4B. In addition, at a rising-up portion LZA and a lowering-down portion LZB of each of the DC magnetization regions LZ1 to LZ5 is preferable the magnetization intensity to be formed so as to gradually increase and decrease at an angle of about 45 degrees for the longitudinal directions of the magnetic tape MT, respectively, as shown in FIG. 4B. This is effective to prevent a recording/reproducing apparatus from misidentifying a change rate of the magnetization intensity at a start and end of the DC magnetization regions LZ1 to LZ5, that is, a change from zero to any of a plus and a minus, as any of a start and end of the servo signals S1 to S5.

In addition, the linear patterns L1 to L8 configuring each of the sub-frames 1 of the servo signals S1 to S5 written within each of the DC magnetization regions LZ1 to LZ5 are written within the DC magnetization LZ1 to LZ5 with adding recording current pulses PC1 to PC5 of a single polarity that are magnetized, as shown in FIG. 4C, in a reverse direction for a magnetic direction of the DC magnetization regions LZ1 to LZ5. Therefore, when reading servo signals recorded as the linear patterns L1 to L8 by a read head of the recording/reproducing apparatus, obtained read signals becomes large in a change rate of signal intensity, compared to a case where there are no DC magnetization regions, thereby an SN ratio resulting in being improved. And as shown in FIG. 4C, the recording magnetization intensity by the recording current pulses P1 to P5 is written at each different intensity. Thus the relative ratios of the DC magnetization intensity of the DC magnetization regions LZ1 to LZ5 and the recording magnetization intensity of the servo signals S1 to S5 become different. For example, provided that the ratios (relative ratios) of the recording intensity by the recording current pulses P1 to P5 (heights of A1 to A5 shown in FIG. 4C) and DC magnetization intensity B, that is, A1/B, A2/B, A3/B, A4/B, and A5/B, are 100, 80, 60, 40, and 20 in this order, when servo signals are read from the servo bands SB1 to SB5 by the read head of the recording/reproducing apparatus, the servo signals indicate outputs in proportion to the relative ratios and result in indicating larger outputs in order of the SB1, SB2, SB3, SB4, and SB5. By reading read signals having different output differences for each of the servo bands SB1 to SB5, each of the servo bands SB1 to SB5 in the lateral direction of the magnetic tape MT can be identified and specified. And data bands adjacent to each of them can be specified.

Figure 5A:
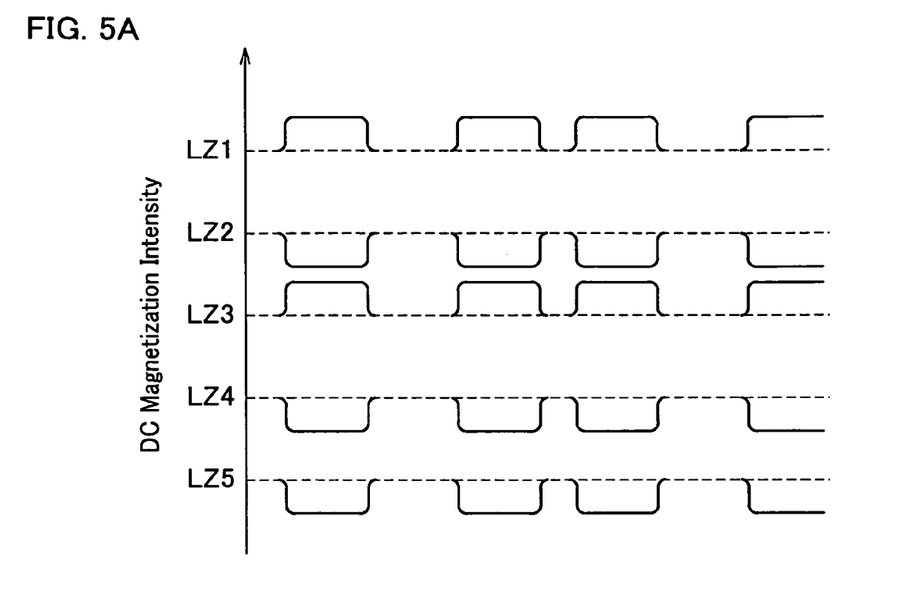
FIG. 5A is a conceptual drawing showing a magnetization state of DC magnetization regions in a magnetic tape of a second embodiment of the present invention.
Figure 5B:
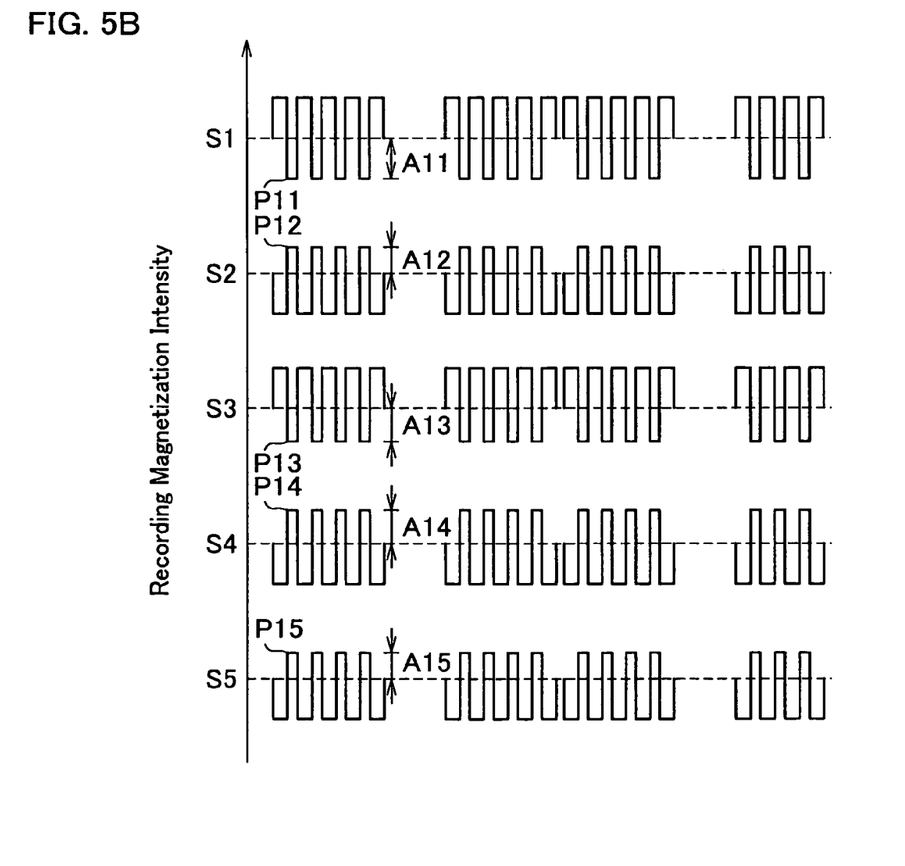
FIG. 5B is a conceptual drawing showing a magnetization state of servo signals.

In addition, FIG. 5A is a drawing showing the magnetization intensity of the DC magnetization regions LZ1 to LZ5 related to a second embodiment of the present invention; FIG. 5B is a drawing showing the recording magnetization intensity of servo signals S1 to S5 (linear patterns L1 to L8) of each of the DC magnetization regions LZ1 to LZ5.

In this magnetic tape along longitudinal directions thereof, same as in the magnetic tape MT related to the first embodiment shown in FIG. 3A, are provided five servo bands SB1 to SB5 at an equal distance in a lateral direction of the magnetic tape, and between these servo bands B1 to B5 are provided the data bands DB1 to DB4. And on each of the servo bands SB1 to SB5 are, same as in the magnetic tape MT related to the first embodiment shown in FIG. 3A, formed the DC magnetization regions LZ1 to LZ5 that are discontinuously magnetized in one direction with opening the distance CL. It is same as in the magnetic tape MT related to the first embodiment that: within each of the DC magnetization regions LZ1 to LZ5 is written each of the predetermined servo signals S1 to S5 for performing tracking-control of a magnetic head; and the servo signals S1 to S5 form sub-frames configured of pairs of linear patterns of the bottom-open-reverse-V letters, L1 and L5, L2 and L6, and L3 and L7, and L4 and L8

In the magnetic tape related to the second embodiment the DC magnetization regions LZ1 to LZ5 in the servo bands SB1 to SB5 are, as shown in FIG. 5A, are magnetized at predetermined intensity in plus and minus magnetic directions by direct current, respectively.

In the servo signals S1 to S5, as shown in FIG. 5A, the DC magnetization region LZ1 is magnetized at predetermined intensity in a plus magnetic direction by direct current, and the DC magnetization region LZ2 is magnetized at predetermined intensity in a minus magnetic direction by direct current. In addition, the DC magnetization region LZ3 is magnetized at predetermined intensity in the plus magnetic direction by direct current, and each of the DC magnetization regions LZ4 and LD5 is magnetized at predetermined intensity in the minus magnetic direction by direct current.

On the other hand, the servo signals S1 to S5 are, as shown in FIG. 5B, written in reverse directions for the magnetic directions of the DC magnetization regions LZ1 to LZ5, where each of the servo signals S1 to S5 is written, and by recording current pulses of different current values. And each of the servo signals S1 to S5, which is written within each of the DC magnetization regions LZ1 to LZ5 by these polarity current pulses, have as shown in FIG. 5B different recording magnetization peaks 11 to 15, respectively. Showing combinations of the magnetic directions of the DC magnetization regions LZ1 to LZ5 and those of the recording magnetization peaks 11 to 15 of the servo signals S1 to S5 in order for each of the servo bands SB1 to SB5, SB1 is (+, −), SB2 is (−, +), SB3 is (+, −), SB4 is (−, +), and SB5 is (−, +). And since peak values of the recording magnetization peak P11 to P15 are different, relative ratios of the DC magnetization intensity B of the DC magnetization regions LZ1 to LZ5 and recording magnetization intensity A11 to A15, that is, A11/B, A12/B, A13/B, A14/B, and A15/B, result in different values whose plus and minus absolute values are different.

If when the relative ratio of the DC magnetization intensity of the DC magnetization region in each of the servo bands SB1 to SB5 and the recording magnetization intensity of each of the servo signals S1 to S5 differs, the servo signals S1 to S5 are read from each of the servo bands SB1 to Sb5 by a read head of a recording/reproducing apparatus, an output difference in proportion to the relative ratio occurs in a read signal. And by reading the read signal having a different output difference for each of the servo bands SB1 to SB5, each servo band in the lateral direction of the magnetic tape can be identified and specified. And data bands adjacent to each servo band can also be specified.

Although in the embodiment thus described each number of servo bands and data bands is made five and that of linear patterns configuring bursts is four, the invention is not limited thereto and is also available for a magnetic tape that has any number of the servo bands and the data bands, and that of the linear patterns configuring the bursts. In addition, although in making the magnetic tape of the first embodiment the magnetic direction of the DC magnetization regions LZ1 to LZ5 is made plus and an example for writing the servo signals in the minus magnetic direction is shown, it may be available to make the magnetic direction of the DC magnetization regions minus and write the servo signals in the plus magnetic direction. Furthermore, although in the first and second embodiments another example where an absolute value of the magnetization intensity of the DC magnetization regions LZ1 to LZ5 is made constant and the recording magnetization intensity is changed with changing the recording current pulses for writing the servo signals, the invention is not limited thereto. For example, making the recording magnetization intensity constant by making the recording current pulses constant, thereby changing the recording magnetization intensity of the DC magnetization regions, the relative ratio in each servo band may be made different.

What is claimed is:

1. A magnetic tape comprising:
   a plurality of servo bands; and
   servo signals for performing tracking-control of a magnetic head,
   wherein said servo signals are recorded on said servo bands,
   wherein a DC magnetization region magnetized in one direction by direct current is arranged along longitudinal directions of said magnetic tape on each of said servo bands,
   wherein each of said servo signals is magnetized in a reverse direction for said one direction of a DC magnetization and is recorded within said DC magnetization region, and
   wherein any of a relative ratio and relative difference of DC magnetization intensity in the DC magnetization region and recording magnetization intensity of each of said servo signals differs for each of said servo bands.

2. A magnetic tape according to claim 1, wherein magnetization intensity at a rising-up portion and lowering-down portion of said DC magnetization region is formed so as to gradually increase and decrease for longitudinal directions of said magnetic tape.

3. A manufacturing method of a magnetic tape where servo signals for performing tracking-control of a magnetic head are recorded on a plurality of servo bands, the method comprising the steps of:
   magnetizing said servo bands in one direction along longitudinal directions of said magnetic tape by direct current;
   forming a DC magnetization region within each of said servo bands; and
   designing so that any of a relative ratio and relative difference of DC magnetization intensity in the DC magnetization region and recording magnetization intensity of each of said servo signals differs for each of said servo bands, when magnetizing said servo signals in a reverse direction for said one direction of a DC magnetization and recording each of said servo signals within said DC magnetization region.

4. A manufacturing method of a magnetic tape according to claim 3, wherein positions of a DC magnetization head and a servo write head are adjusted, and a forming of a DC magnetization region on each of said servo bands and a writing of said servo signals by said servo write head are performed at predetermined timings in accordance with a running speed of said magnetic tape.

5. A manufacturing method of a magnetic tape according to claim 4, wherein a recording current pulse is made constant, magnetization intensity within said DC magnetization region is changed, and a relative ratio in each of said servo bands is made different.

6. A manufacturing method of a magnetic tape according to claim 3, wherein magnetization intensity at a rising-up portion and lowering-down portion of said DC magnetization region is formed so as to gradually increase and decrease for longitudinal directions of said magnetic tape.

7. A servo write method according to claim 6, wherein a recording current pulse is made constant, magnetization intensity within said DC magnetization region is changed, and a relative ratio in each of said servo bands is made different.

8. A manufacturing method of a magnetic tape according to claim 3, wherein an absolute value of magnetization intensity within said DC magnetization region is made constant, recording current pulse intensity for writing said servo signals is changed, and recording magnetization intensity is changed.

9. A manufacturing method of a magnetic tape according to claim 3, wherein a recording current pulse is made constant, magnetization intensity within said DC magnetization region is changed, and a relative ratio in each of said servo bands is made different.

10. A servo writer that writes servo signals for performing tracking-control of a magnetic head on a plurality of servo bands of a magnetic tape, the writer comprising:
    a DC delete head for discontinuously magnetizing each of said servo bands in one direction along longitudinal directions of said magnetic tape by direct current and forming a DC magnetization region at a predetermined distance within each of said servo bands; and
    a servo write head for adding a recording current pulse of a single polarity within said DC magnetization region, magnetizing said servo signals in a reverse direction for said one direction of a DC magnetization, and writing said servo signals so that any of a relative ratio and relative difference of DC magnetization intensity in the DC magnetization region and recording magnetization intensity of each of said servo signals differs for each of said servo bands.

11. A servo writer according to claim 10, wherein positions of a DC magnetization head and a servo write head are adjusted, and a forming of a DC magnetization region on each of said servo bands and a writing of said servo signals by said servo write head are performed at predetermined timings in accordance with a running speed of said magnetic tape.

12. A servo write method according to claim 11, wherein a recording current pulse is made constant, magnetization intensity within said DC magnetization region is changed, and a relative ratio in each of said servo bands is made different.

13. A servo writer according to claim 10, wherein magnetization intensity at a rising-up portion and lowering-down portion of said DC magnetization region is formed so as to gradually increase and decrease for longitudinal directions of said magnetic tape.

14. A servo writer according to claim 10, wherein an absolute value of magnetization intensity within said DC magnetization region is made constant, recording current pulse intensity for writing said servo signals is changed, and recording magnetization intensity is changed.

15. A servo writer according to claim 10, wherein a recording current pulse is made constant, magnetization intensity within said DC magnetization region is changed, and a relative ratio in each of said servo bands is made different.

16. A servo write method for supplying a recording current to a servo write head and writing servo signals on servo bands of a magnetic tape, the method comprising the steps of:

magnetizing said servo bands in one-direction along longitudinal directions of said magnetic tape;

forming a DC magnetization region within each of said servo bands; and designing so that any of a relative ratio and relative difference of DC magnetization intensity in the DC magnetization region and recording magnetization intensity of each of said servo signals differs for each of said servo bands, when adding a recording current pulse of a single polarity to said servo write head and recording each of said servo signals magnetized in a reverse direction for said one direction of a DC magnetization within said DC magnetization region.

17. A servo write method according to claim 16, wherein positions of a DC magnetization head and a servo write head are adjusted, and a forming of a DC magnetization region on each of said servo bands and a writing of said servo signals by said servo write head are performed at predetermined timings in accordance with a running speed of said magnetic tape.

18. A servo write method according to claim 16, wherein magnetization intensity at a rising-up portion and lowering-down portion of said DC magnetization region is formed so as to gradually increase and decrease for longitudinal directions of said magnetic tape.

19. A servo write method according to claim 16, wherein an absolute value of magnetization intensity within said DC magnetization region is made constant, recording current pulse intensity for writing said servo signals is changed, and recording magnetization intensity is changed.

20. A servo write method according to claim 16, wherein a recording current pulse is made constant, magnetization intensity within said DC magnetization region is changed, and a relative ratio in each of said servo bands is made different.

* * * * *